(12) United States Patent
Sun et al.

(10) Patent No.: US 11,380,023 B2
(45) Date of Patent: Jul. 5, 2022

(54) END-TO-END RELIGHTING OF A FOREGROUND OBJECT OF AN IMAGE

(71) Applicant: Adobe Inc., San Jose, CA (US)

(72) Inventors: Xin Sun, San Jose, CA (US); Ruben Villegas, San Jose, CA (US); Manuel Lagunas Arto, San Jose, CA (US); Jimei Yang, San Jose, CA (US); Jianming Zhang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 72 days.

(21) Appl. No.: 16/823,092

(22) Filed: Mar. 18, 2020

(65) Prior Publication Data

US 2021/0295571 A1  Sep. 23, 2021

(51) Int. Cl.
*G06T 7/11* (2017.01)
*G06T 7/194* (2017.01)
*G06T 7/90* (2017.01)
*G06T 11/00* (2006.01)

(52) U.S. Cl.
CPC .............. *G06T 11/001* (2013.01); *G06T 7/11* (2017.01); *G06T 7/194* (2017.01); *G06T 7/90* (2017.01); *G06T 2207/20084* (2013.01); *G06T 2207/30196* (2013.01)

(58) Field of Classification Search
CPC ... G06T 7/11; G06T 7/194; G06T 7/90; G06T 11/001; G06T 2207/20084; G06T 2207/30196
See application file for complete search history.

(56) References Cited

U.S. PATENT DOCUMENTS

| 2005/0041024 A1* | 2/2005 | Green | G06T 15/06 345/426 |
| 2005/0080602 A1* | 4/2005 | Snyder | G06T 15/506 703/2 |
| 2009/0027390 A1* | 1/2009 | Bin Zafar | G06T 15/506 345/426 |

(Continued)

OTHER PUBLICATIONS

Kanamori et al. ("Relighting Humans: Occlusion-Aware Inverse Rendering for Full-Body Human Images," ACM transactions on Graphics, vol. 37, No. 6, Nov. 2018) (Year: 2018).*

(Continued)

*Primary Examiner* — Yubin Hung
(74) *Attorney, Agent, or Firm* — Keller Preece PLLC

(57) ABSTRACT

Introduced here are techniques for relighting an image by automatically segmenting a human object in an image. The segmented image is input to an encoder that transforms it into a feature space. The feature space is concatenated with coefficients of a target illumination for the image and input to an albedo decoder and a light transport detector to predict an albedo map and a light transport matrix, respectively. In addition, the output of the encoder is concatenated with outputs of residual parts of each decoder and fed to a light coefficients block, which predicts coefficients of the illumination for the image. The light transport matrix and predicted illumination coefficients are multiplied to obtain a shading map that can sharpen details of the image. Scaling the resulting image by the albedo map to produce the relight image. The relight image can be refined to denoise the relight image.

20 Claims, 9 Drawing Sheets
(3 of 9 Drawing Sheet(s) Filed in Color)

(56) References Cited

U.S. PATENT DOCUMENTS

| | | | |
|---|---|---|---|
| 2014/0267248 A1* | 9/2014 | Zou | G06T 15/60 345/420 |
| 2014/0294292 A1* | 10/2014 | Aoba | G06K 9/00208 382/159 |
| 2015/0312553 A1* | 10/2015 | Ng | H04N 5/23203 348/47 |
| 2017/0148205 A1* | 5/2017 | Sunkavalli | G06T 15/04 |
| 2018/0189978 A1* | 7/2018 | Dong | G06T 7/40 |
| 2018/0365874 A1* | 12/2018 | Hadap | G06N 3/0454 |
| 2019/0130562 A1* | 5/2019 | Liu | G06K 9/4628 |
| 2019/0244435 A1* | 8/2019 | Grenfell | G06T 19/20 |
| 2019/0311202 A1* | 10/2019 | Lee | G06K 9/6256 |
| 2019/0340810 A1* | 11/2019 | Sunkavalli | G06T 15/506 |
| 2020/0218961 A1* | 7/2020 | Kanazawa | G06T 5/002 |
| 2020/0342360 A1* | 10/2020 | Chen | G06N 3/0454 |
| 2020/0364870 A1* | 11/2020 | Lee | G06T 7/10 |
| 2021/0056703 A1* | 2/2021 | Chen | G06N 3/08 |

OTHER PUBLICATIONS

Sun et al. ("Single Image Portrait Relighting," ACM Trans. Graph, vol. 38, No. 4, Jul. 2019) (Year: 2019).*

Sang ("Image sharpening by Gaussian and Butterworth high pass filter," Biomedical and Pharmacology Journal, vol. 7(2), 2014) (Year: 2014).*

Han et al. ("Learning Intrinsic Image Decomposition by Deep Neural Network with Perceptual Loss," 24th International Conference on Pattern Recognition; Date of Conference: Aug. 20-24, 2018) (Year: 2018).*

Lettry et al. ("DARN: A Deep Adversarial Residual Network for Intrinsic Image Decomposition," IEEE Winter Conference on Applications of Computer Vision; Date of Conference: Mar. 12-15, 2018) (Year: 2018).*

Baslamisli et al. ("CNN Based Learning Using Reflection and Retinex Models for Intrinsic Image Decomposition," IEEE/CVF Conference on Computer Vision and Pattern Recognition; Date of Conference: Jun. 18-23, 2018) (Year: 2018).*

Carlson ("Shadow Transfer: Single Image Relighting for Urban Road Scenes," arXiv:1909.10363; Sep. 23, 2019) (Year: 2019).*

Ronnenberger ("U-Net: Convolutional Networks for Biomedical Image Segmentation," International Conference on Medical Image Computing and Computer-Assisted Intervention, 2015) (Year: 2015).*

Peers et al. ("Post-production Facial Performance Relighting Using Reflectance Transfer," SIGGRAPH 2007) (Year: 2007).*

Sengupta et al. ("SfSNet: Learning Shape, Reflectance and Illuminance of Faces in the Wild," IEEE/CVF Conference on Computer Vision and Pattern Recognition; Date of Conference: Jun. 18-23, 2018) (Year: 2018).*

Lin et al. ("RefineNet: Multi-path Refinement Networks for High-Resolution Semantic Segmentation," IEEE Conference on Computer Vision and Pattern Recognition; Date of Conference: Jul. 21-26, 2017) (Year: 2017).*

Zhou et al. ("Deep Single-Image Portrait Relighting," IEEE/CVF International Conference on Computer Vision (ICCV); Date of Conference: Oct. 27-Nov. 2, 2019) (Year: 2019).*

Quan et al. ("FusionNet: A deep fully residual convolutional neural network for image segmentation in connectomics," arXiv:1612.05360, Dec. 16, 2016) (Year: 2016).*

Cohen, Michael A., et al., "Radiosity and realistic image synthesis", Elsevier; USA; 412 pages., 2012.

Debevec, Paul, "Rendering synthetic objects into real scenes: Bridging traditional and image-based graphics with global illumination and high dynamic range photography", In ACM SIGGRAPH 2008 Classes, SIGGRAPH '08, pp. 32:1-32:10, New York, NY, USA; 9 pages., 2008.

Kajiya, James T., California Institute of Technology; Dallas, TX, USA; In ACM SIGGRAPH computer graphics, vol. 20, pp. 143-150; Aug. 18-22, 1986; vol. 20, No. 4., 1986.

Kanamori, Yoshihiro, et al., "Relighting humans: occlusion-aware inverse rendering for full-body human images", In SIGGRAPH Asia 2018 Technical Papers, p. 270; ACM, 2018., 2018.

Ramamoorthi, Ravi, et al., "An efficient representation for irradiance environment maps", In Proceedings of the 28th annual conference on Computer graphics and interactive techniques, pp. 497-500. ACM, 2001., 2001.

Simonyan, Karen, et al., "Very deep convolutional networks for large-scale image recognition", arXiv: preprint arXiv:1409.1556v6, 2015; 14 pages., 2015.

Sloan, Peter-Pike, et al., "Precomputed radiance transfer for real-time rendering in dynamic, low-frequency lighting environments", ACM Trans. Graph., 21(3):527-536,10 pages; Jul. 2002, 2002.

Sun, Tiancheng, et al., "Single image portrait relighting", ACM Transactions on Graphics (TOG), 38(4):79, 9 pages, 2019., 2019.

* cited by examiner

100

102
Receive an image including a foreground object and a background.

104
Automatically segment the foreground object relative to the background to thereby produce a segmented image.

106
Process the segmented image with an encoder to convert the segmented image into a feature vector.

108
Concatenate the feature vector with coefficients of a target illumination to an albedo decoder and a light transport decoder, the output of the albedo decoder including an albedo map, and the output of the light transport decoder including a light transport matrix.

110
Predict illumination coefficients for the image by concatenating an output of the albedo decoder and an output of the light transport decoder with the feature vector.

112
Generate a shading map of the image based on the light transport matrix and the predicted illumination coefficients.

114
Produce a relight image of the image based on the albedo map and the shading map.

FIGURE 1B

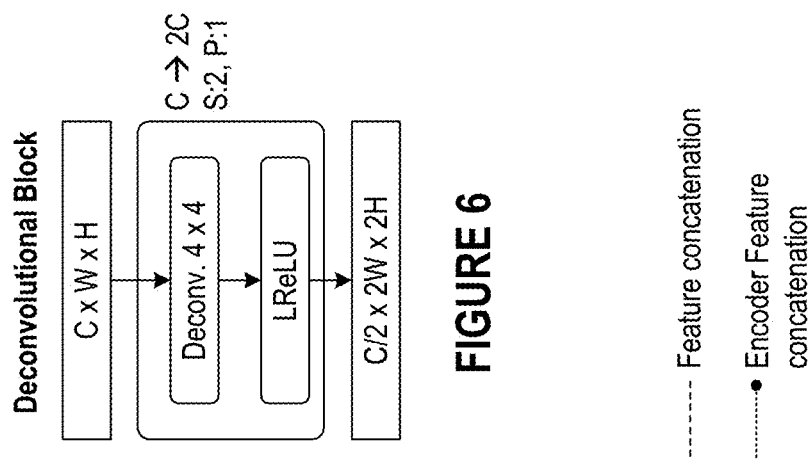
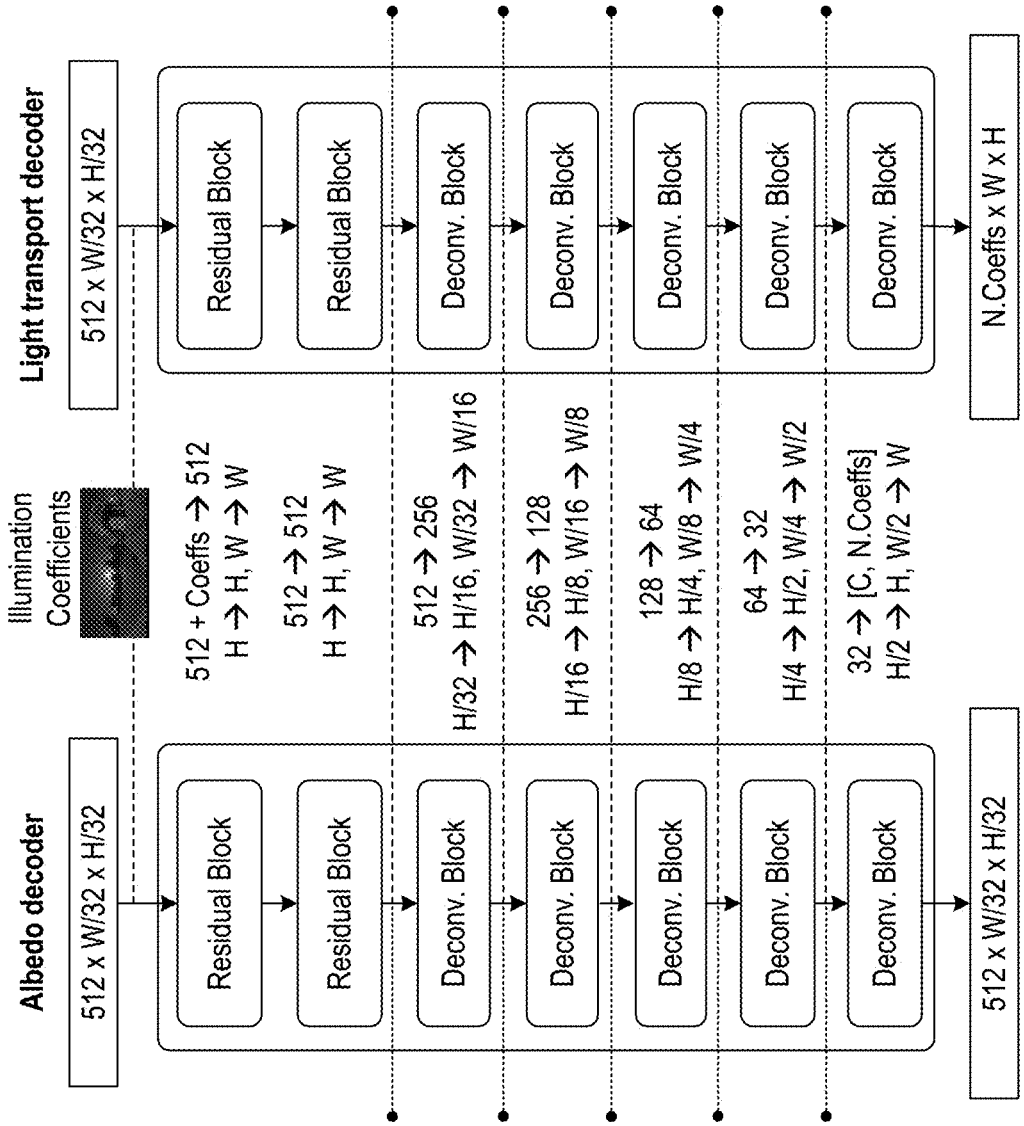
FIGURE 6
FIGURE 5

END-TO-END RELIGHTING OF A FOREGROUND OBJECT OF AN IMAGE

TECHNICAL FIELD

The disclosed teachings generally relate to a technique for end-to-end relighting of a foreground object (e.g., human) relative to a background of an image, in real-time or near real-time.

BACKGROUND

With the development of machine intelligence in recent years, photographs are no longer simply static images for display. In fact, digital images are a popular type of media captured by mobile devices and are routinely subject to editing. Typical image editing tools include conventional computer systems running sophisticated software (e.g., Adobe Photoshop®, After Effects™) that has a steep learning curve and, therefore, offer limited features for non-professional consumers. Popular implementations of image editing tools include applications ("apps") for mobile devices, which are designed for user interactions on small screens (e.g., touchscreens). The interactions for image editing on mobile devices should be intuitive because of the limited interface on the small screens. Thus, image editing tools for mobile apps are substantially more limited compared to professional image editing tools. Accordingly, the algorithms to edit photographic images on modern mobile platforms need to at least partially be automated to avoid the need for intensive or professional inputs. For example, editing an image on a mobile device should preferably only require a few clicks or swipes on a touchscreen.

Images of human subjects are commonly modified by consumers, and a large portion of the images that are captured on mobile platforms include humans. For example, consumers would like to change the faces on an image, transfer facial expressions, replace a background, or beautify makeup on a face. However, observers can readily perceive an unrealistic effect on images that were generated with existing editing algorithms that render the images with conventional models in a conventional image editing process.

BRIEF DESCRIPTION OF THE DRAWINGS

This disclosure contains at least one drawing executed in color. Copies of the corresponding publication with color drawings will be provided by the Office upon request and payment of the necessary fee.

FIG. 1B is a flowchart that illustrates a process of end-to-end relighting of a foreground object in an image.

FIG. 5 is a block diagram that illustrates an albedo decoder and a light transport decoder.

FIG. 6 is a block diagram that illustrates a deconvolution block.

Figure 1A:
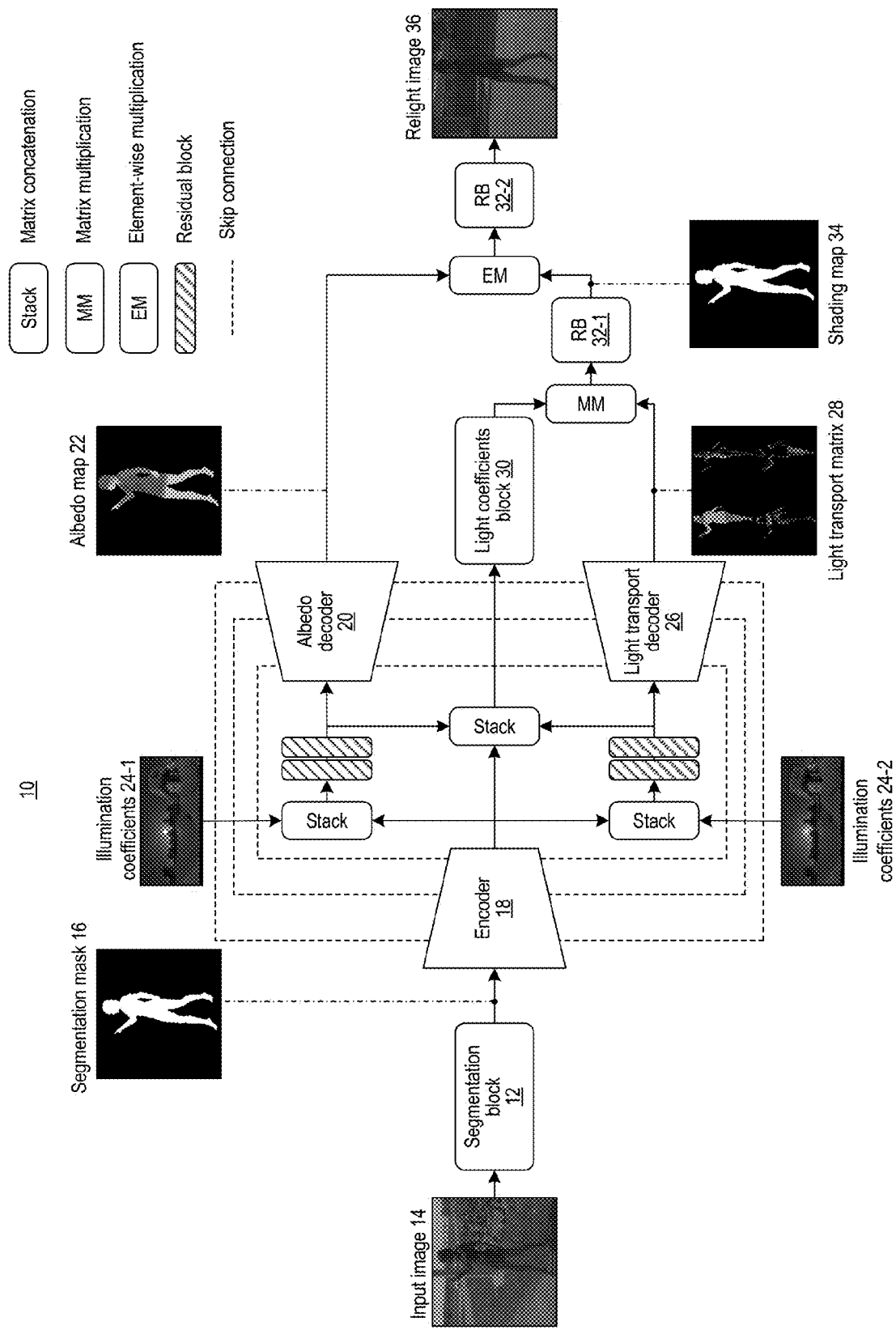
FIG. 1A is a block diagram that illustrates a framework operable to perform end-to-end relighting of a foreground object in an image.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed techniques include an end-to-end solution to relight a foreground object on the background of an image, in real-time or near real-time. Although the disclosure includes examples that relate to a human subject in a photographic image, any other foreground object on a background of any image could benefit from the relighting techniques disclosed herein. Examples of other foreground objects include animals, vehicles, homes, food, or any other objects in an image that users desire to modify with relighting. In one example, a framework can automatically perform a segmentation process to separate a human subject from a background in a photographic image. The automatic relighting of the human subject or any other foreground object in an image can be achieved without manual inputs, or with fewer manual inputs compared to existing systems. The disclosed techniques can include different component operations that can model or infer the shading on a human subject in a photographic image, including environmental lighting, global radiance transport, and material properties to relight the image. For example, as described further below, the global radiance transport can include indirect inter-reflection between a virtual ground plane and the human body in an image.

As used herein, "image relighting" may refer to changing the illumination of an image to a target illumination effect without necessarily knowing the original scene geometry, material information, and an illumination condition. A relighting operation is fundamental among various image editing operations, especially in the context of editing images that include human subjects. For example, relighting may be desired when replacing a background image, for illumination beautification, or to place human subjects in a new virtual environment.

A conventional computer-implemented process for relighting an image of a human subject typically involves complicated manual inputs. The conventional relighting process is complicated because an editing platform is fed only a single, colored image, usually without any information related to illumination, materials, or geometries of the content in the image. Thus, a user has to manually edit the image to provide a relighting effect. As a result, an observer can readily perceive an unrealistic relighting effect because conventional relighting algorithms render an image based on unreliable manual inputs.

One technique for relighting includes using deep learning, which exploits a large data set prior to processing an image, to understand a setup for the image (e.g., content, features). Deep learning can provide improved results for human relighting, when built on a set of rendered images of synthesized human subjects. Existing deep learning algorithms estimate self-shadowing of a human body other than local shading of materials. That is, the algorithms are capable of rendering only direct illumination when performing a relighting process. Moreover, prior implementations for deep learning are limited because they require manual segmentation of the human body from the background image. That is, a user has to manually separate the human object in an image from the background of the image. Thus, utilizing a deep learning algorithm for relighting is still not feasible and there is no existing relighting application for broad consumer use.

Various embodiments and implementations of the disclosed framework include systems and methods described herein. This description provides specific details for a thorough understanding and an enabling description of these implementations. One skilled in the art will understand, however, that the invention can be practiced without many of these details. Additionally, some well-known structures or functions may not be shown or described in detail for the sake of brevity. The terminology used in the description presented below is intended to be interpreted in its broadest reasonable manner, even though it is being used in conjunction with a detailed description of certain specific implementations of the invention.

Although not required, implementations are described below in the general context of computer-executable instructions, such as routines executed by a general-purpose data processing device, e.g., a networked server computer, mobile device, or personal computer. Those skilled in the relevant art will appreciate that the invention can be practiced with other communications, data processing, or computer system configurations, including: Internet appliances, handheld devices, wearable computers, all manner of cellular or mobile phones, multi-processor systems, microprocessor-based or programmable consumer electronics, set-top boxes, network PCs, mini-computers, mainframe computers, media players and the like. Indeed, the terms "computer," "server," and the like are generally used interchangeably herein, and refer to any of the above devices and systems, as well as any data processor.

While aspects of the disclosed implementations, such as certain functions of the framework, can be performed exclusively or primarily on a single device, some implementations can also be practiced in distributed environments where functions or modules are shared among disparate processing devices, which are linked through a communications network, such as a local area network (LAN), wide area network (WAN), or the Internet. In a distributed computing environment, program modules can be located in both local and remote memory storage devices.

Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other non-transitory data storage media. In some implementations, computer implemented instructions, data structures, screen displays, and other data under aspects of the invention can be distributed over the Internet or over other networks (including wireless networks), on a propagated signal on a propagation medium (e.g., an electromagnetic wave(s), a sound wave) over a period of time, or they can be provided on any analog or digital network (e.g., packet switched, circuit switched, or other scheme).

In one example of the disclosed solution, a framework with algorithms can provide automatic human relighting by introducing a segmentation operation in an inference neural network. The solution can perform both direct and indirect illumination. An implementation includes an application ("app") for a mobile platform that offers an end-to-end solution for human relighting. For example, a photo-editing mobile app can include advanced lighting effects. In one instance, only direct illumination is rendered, which is assumed and limited in both training data and an inference model. The disclosed technique extends this solution to global transport such that indirect illumination is also considered. In particular, the disclosed techniques assume that there is a virtual ground plane where human subjects in images are standing and then renders with differential rendering. The virtual ground plane is a non-distant environmental setting for relighting of a human object. Therefore, the bottom part of environment lighting or a background image is taken as the illumination from ground plane, and the inter-reflection between a human body and ground plane is also rendered in accordance with the disclosed solution.

Radiance Transport

In computer graphics, realistic photographic rendering aims to solve a rendering equation. The rendering equation describes radiance leaving a point as the emitted radiance, and the sum of the reflected radiance over a hemisphere around the surface normal in that point. The rendering equation can be written in the following form:

$$L_s(x,\omega_o,\lambda,t) = L_e(x,\omega_o,\lambda,t) + \int_\Omega f_r(x,\omega_i,\omega_o,\lambda,t) L_i(x,\omega_i,\lambda,t)(\omega_i \cdot n) d\omega_i \quad (1)$$

where x is the location in space.

$\omega_o$ is the direction of outgoing light.

$\lambda$ is the wavelength of the light.

t is time.

$L_s(x,\omega_o,\lambda,t)$ is the spectral radiance of wavelength $\lambda$, along direction at time t, from the position x.

$L_e(x,\omega_o,\lambda,t)$ is the emitted spectral radiance.

n is the surface normal at x.

$\Omega$ is the unit hemisphere around the surface normal n.

$\omega_i$ is the negative direction of incoming light.

$\int_\Omega (\ldots) d\omega_i$ is the integral over $\Omega$.

$f_r(x,\omega_i,\omega_o,\lambda,t)$ is the bidirectional reflectance distribution function (BRDF). Amount of light reflected from $\omega_i$ to $\omega_o$, at position x, time t, and wavelength $\lambda$.

$L_i(x,\omega_i,\omega_o,\lambda,t)$ is the spectral radiance of wavelength $\lambda$, coming inward towards x, at time t, from direction $\omega_i$.

$(\omega_i \cdot n)$ is a decay factor of $L_i$ due to the incident angle.

Implementations of the disclosed techniques involve various assumptions. For example, the original rendering equation is assumed to have a dependence in light spectra and time. Moreover, light is assumed to travel at infinite speed and in a straight line.

Other assumptions relate to the visible spectrum of light, using a single frame, distant illumination, and non-emissive objects. For example, regarding the visible spectrum, the disclosed technique can sample $L_o$ to lie only in the visible spectrum of the light wavelength. Therefore, the $\lambda$ notation is avoided. Regarding a single frame, the disclosed techniques are assumed not to account for motion blur effects and aim to obtain a static image. As such, the value of time t is constant and can thus be ignored. Regarding distant illumination, the disclosed techniques use illumination that reliably represents the real-world. Therefore, $L_i$ can be represented by an environment map captured from the real-world. Accordingly, the disclosed techniques assume that a light source has sufficient distance to a surface such that all points are at the same distance to a light source. In this way, incoming illumination becomes a function of the incident direction alone, $L_i(x,\omega_i) \approx L_i(\omega_i)$. Regarding non-emissive objects, the disclosed technique assumes that humans or the clothes they wear do not emit light. Therefore, the term $L_e(x,\omega_o)=0$. Based on these assumptions, and omitting the surface position, the rendering equation has the resulting form:

$$L_s(\omega_o) = \int_\Omega f_r(\omega_i,\omega_o) L_i(\omega_i)(\omega_i \cdot n) d\omega_i. \tag{2}$$

An unbiased estimation of Equation 1 can be achieved using Monte Carlo integration, at the expense of introducing variance. However, variance can be reduced by increasing the sampling rate and providing wider sampling distributions that resemble the shape of $f_r$. Nevertheless, achieving an unbiased, and low variance estimation in a real-time (or interactive-time) application is a challenging task.

Spherical Harmonics Lighting

The disclosed technique works with real spherical harmonics. Spherical harmonics are a mathematical method analogous to the Fourier transform over a 1D circle but defined across the surface of a sphere. They are usually defined on imaginary numbers but, for light intensity, as here, an approximation over a sphere is utilized. Hence, unless indicated to the contrary, reference to spherical harmonics herein refers to their real values.

Spherical harmonics are advantageous for capturing low-frequency signals and can be used in order to obtain a real-time approximation of the rendering equation. One formulation projects the spherical signals of the incoming illumination distribution $L_i$ and the cosine decay term $(\omega_i \cdot n)$ of the irradiance:

$$E(n) = \int_\Omega L_i(\omega_i)(\omega_i \cdot n) d\omega_i \tag{3}$$

and then approximates the rendering equation by calculating the radiosity on each point $B(x,n)$, which corresponds only to the light diffusely scattered $$B(x,n) = \rho(x) E(n) \tag{4}$$

where $\rho$ is the value of the albedo at location x.

By projecting the spherical harmonics of the irradiance E and then calculating the radiosity of a scene B, an approximation of the rendering equation is obtained where only the diffuse reflections are handled and, as such, the final appearance of the materials lack realism. Thus, the spherical harmonics of the radiance $L_s$ defined in Equation (2) takes into account the BRDF of the materials $f_r$. By using the elevation $\theta$ and azimuth $\phi$ angles to parametrize a unit direction vector $\omega_i = (\theta,\phi)$, the incoming illumination can be decomposed as:

$$L_i(\theta, \phi) = \sum_{l,m} (L_i)_{l,m} Y_{l,m}(\theta, \phi). \tag{5}$$

The cosine term, together with the BRDF, can be defined as $f_r(\omega_i,\omega_o)(\omega_i \cdot n) = f_r(\omega_i,\omega_o)\cos\theta = A(\theta,\phi)$. This can be decomposed as $$A(\theta, \phi) = \sum_l A_{l,m} Y_{l,m}(\theta, \phi). \tag{6}$$

where $Y_{l,m}$ are spherical harmonics with band index $l \in l \geq 0$, and $m \leq 2$. The terms $(L_i)_{l,m}$ and $A_l$ are the coefficients for the illumination, and cosine decay respectively.

The integral of Equation (2) can be rewritten in terms of spherical harmonics $$L_s(\theta, \phi) = \sum_{l,m} \hat{A}_{l,m}(L_i)_{l,m} Y_{l,m}(\theta, \phi) \text{ with } \hat{A}_{l,m} = \sqrt{\frac{4\pi}{2l+1}} A_{l,m}. \tag{7}$$

Lastly, in order to have a fast approximation to Equation (2), the coefficients as vectors can be rewritten, where:

$$\{(L_i)_{l,m}\} = \mathcal{L},$$

and the basis function:

$$\{\hat{A}_{l,m} Y_{l,m}\} = \mathcal{T},$$

the radiance $L_s$ of the final image can directly calculate as a dot product:

$$L_S = \mathcal{T} \cdot \mathcal{L}. \tag{8}$$

In some implementations, this should be done for each channel RGB to obtain the final image $\psi$.

Spherical Harmonics Approximation

Equation (8) allows for efficient approximations of $L_s$ only when $L_{l,m}$ and $A_{l,m}$ have been previously precomputed. For any given distant illumination $L_i$, $(L_i)_{l,m}$ coefficients can be calculated as:

$$(L_i)_{l,m} = \int_{\theta=0}^{\pi} \int_{\phi=0}^{2\pi} L_i(\theta, \phi) Y_{l,m} \sin(\theta) d\theta d\phi \tag{9}$$

and the coefficients $A_{l,m}$ for a fixed $\omega_o$ can be calculated as:

$$A_{l,m} = \int_{\theta=0}^{\pi} \int_{\phi=0}^{2\pi} f_r(\{\theta, \phi\}, w_o) Y_{l,m} \sin(\theta) \cos(\theta) d\theta d\phi. \tag{10}$$

Where $Y_{l,m}$ are constant values. An unbiased estimation of $(L_i)_{l,m}$ and $A_{l,m}$ can be obtained using Monte Carlo integration. Nevertheless, to obtain a low variance estimation, a large number of samples are required, making this approximation step burdensome to run in real-time (or interactive-time) applications. As such, the rendering equation can be approximated in real-time only for scenes that are known beforehand ($L_i$ and $f_r(\{\theta,\phi\},w_o)\cos(\theta)$) are known and the coefficients have been precomputed).

Generalize to Global Transport

The formulation of spherical harmonics lighting is based on Equation (1), which is in the form of local shading. In other words, $L_i(\omega_i)$ can include direct lighting from the emitter if not occluded, and it can also include indirect lighting because of inter-reflections. $L_i(\omega_i)$ varies with respect to different positions. Further, this is difficult to evaluate without an expensive Monte Carlo simulation. Therefore, the spherical harmonics lighting can be formulated directly with distant environmental lighting instead of local incoming radiance. Because the local incoming radiance is linearly dependent on the light source, the following equation follows:

$$L = M \hat{L}, \quad (11)$$

where $\hat{L}$ is the spherical harmonics coefficients of distant lighting, and M is a square matrix to convert environmental lighting to local incoming radiance. Taking Equation (11) into Equation (8), the global illumination result as the product of spherical harmonics coefficients follows as:

$$L_s = (M^T T) \cdot \hat{L}. \quad (12)$$

In some embodiments, the formulation is with respect to distant environmental lighting instead of local incoming radiance. Thus, it is denoted that $(M^T T)$ and $\hat{L}$ with T and L, respectively, for brevity.

The transport coefficients T vary according to individual algorithms. In some algorithms, T represents the self-occlusions of a human body. In other algorithms, T is a full global transport including inter-reflections, as well as the transport with a virtual ground plane.

Relighting

Relighting involves changing the incoming illumination $L_i$ in a scene, for a target illumination specified by the user $L_i'$. As such, the integral of Equation (2) is solved with the new $L_i'$. However, a new image can be generated using the spherical harmonics decomposition of Equation (8), where the relighting problem consists on finding a new vector L' from the target illumination and then evaluating the dot-product again. This will yield a new image $L_s'$, relight with the target illumination $L_i'$:

$$L_s' = T^T \cdot L' \quad (13)$$

Example Framework

An objective of the disclosed techniques is to relight an image with a human in it ψ, with a user-specified target illumination $L_i'$:

$$\mathcal{R}(\psi, L_i') = \psi' \quad (14)$$

where $\mathcal{R}$ is a perfect relight function and ψ' is the resulting relight image with illumination $L_i'$. Using spherical harmonics, an approximation is obtained as:

$$L_s' \approx T^T \cdot L'. \quad (15)$$

However, due to the spherical harmonics decomposition, this approximation can fail to recover high-frequency details. Moreover, the vector T encodes most information about the scene (e.g., shading, albedo, and materials), which makes it challenging to approximate the information about the scene. Therefore, the vector T can be additionally decomposed as:

$$T = T_s \rho \quad (16)$$

where ρ refers to the albedo. In order to approximate the relight radiance $L_s'$, a dot product is calculated between the coefficients and scaled by the albedo $$L_s' \approx (T_s^T \cdot L') \rho. \quad (17)$$

Finally, an approximation to a ground-truth radiance for each channel can be $$L_s' \approx \mathcal{D}((T_s^T \cdot L') \rho) \quad (18)$$

where $\mathcal{D}$ is an enhancement function that alleviates the problems of the spherical harmonics decomposition approximating high-frequencies and brings it closer to the path-traced result. However, computing the coefficients T and L' is not necessarily a fast operation. Therefore, solving the integral Equations (9) and (10) is avoided and, instead, the solution is approximated with the following function:

$$T_s, L', \rho \approx \mathcal{G}(\psi, L_i', \alpha) \quad (19)$$

where $\mathcal{G}$ is a parametric function that takes the input image ψ and the target illumination $L_i'$ as the input, together with its parameters α. In particular, $\mathcal{G}$ can be a convolutional neural network (CNN) that can perform the relighting task in other domains or with human input and more expressive materials. Later, it will be necessary to only obtain T and L' for each RGB channel, and perform $\mathcal{D}(T^T \cdot L', \beta)$ to get the final image. $\mathcal{D}$ is also a parametric function with parameters β. Additionally, the albedo ρ of the input image ψ is predicted. This allows for fully reconstructing the final relight radiance $L_s'$ for each channel and, therefore, the relight image ψ'. The variable T, as used herein, may refer to the light transport coefficients and L, as used herein, may refer to the illumination coefficients.

The disclosed framework, which is based on the decomposition proposed by spherical harmonics, has two advantages. First, processing an image decomposition based on spherical harmonics (albedo, light transport, and illumination coefficients) allows relighting of new images in real-time (or near real-time), where only the coefficients of the target illumination need to be multiplied by the light transport and shading map to obtain the predicted image. The disclosed framework splits the problem of image relighting into a set of smaller problems that are easier for the model to process. Therefore, this allows for higher quality reconstructions compared to using a direct pixel-to-pixel transformation.

FIG. 1A is a block diagram that illustrates a framework operable to perform end-to-end relighting of a foreground object in an image. As shown, the framework 10 has an architecture that includes a segmentation block 12 that receives an input image 14 and outputs a segmentation mask 16. An encoder 18 receives a masked image and outputs a feature space. An albedo decoder 20 outputs an albedo map 22 based in part on target illumination coefficients 24-1 L. A light transport decoder 26 outputs a light transport matrix 28 T based in part on target illumination coefficients 24-2 L. A light coefficients block 30 predicts the coefficients for the illumination of the image. Two refinement blocks 32-1 and 32-2 can remove noise and improve the quality of a predicted shading map 34, and the predicted relight image 36 ψ', respectively.

FIG. 1B is a flowchart that illustrates a process 100 of the framework 10 to perform end-to-end relighting of a foreground object in an image. As shown, the end-to-end relighting process involves receiving the image 14 including a foreground object and a background (step 102). In particular, the segmentation block 12 receives the image 14 to generate the segmentation mask 16 of the image 14. In the illustrated example, the image 14 includes a human object and a background. The image 14 is received from, for example, an image editing application, a cloud-configured storage or computing system, or an additional computing system. In some cases, the image 14 includes pixels (e.g., a .jpeg, .gif, or bitmap image file). In some embodiments, the image 14 includes vector-based graphical information (e.g., an image in a .svg, .ai, or .dwg file format). In some embodiments, an image including vector-based data is converted to an image including pixel-based data.

Figure 2:
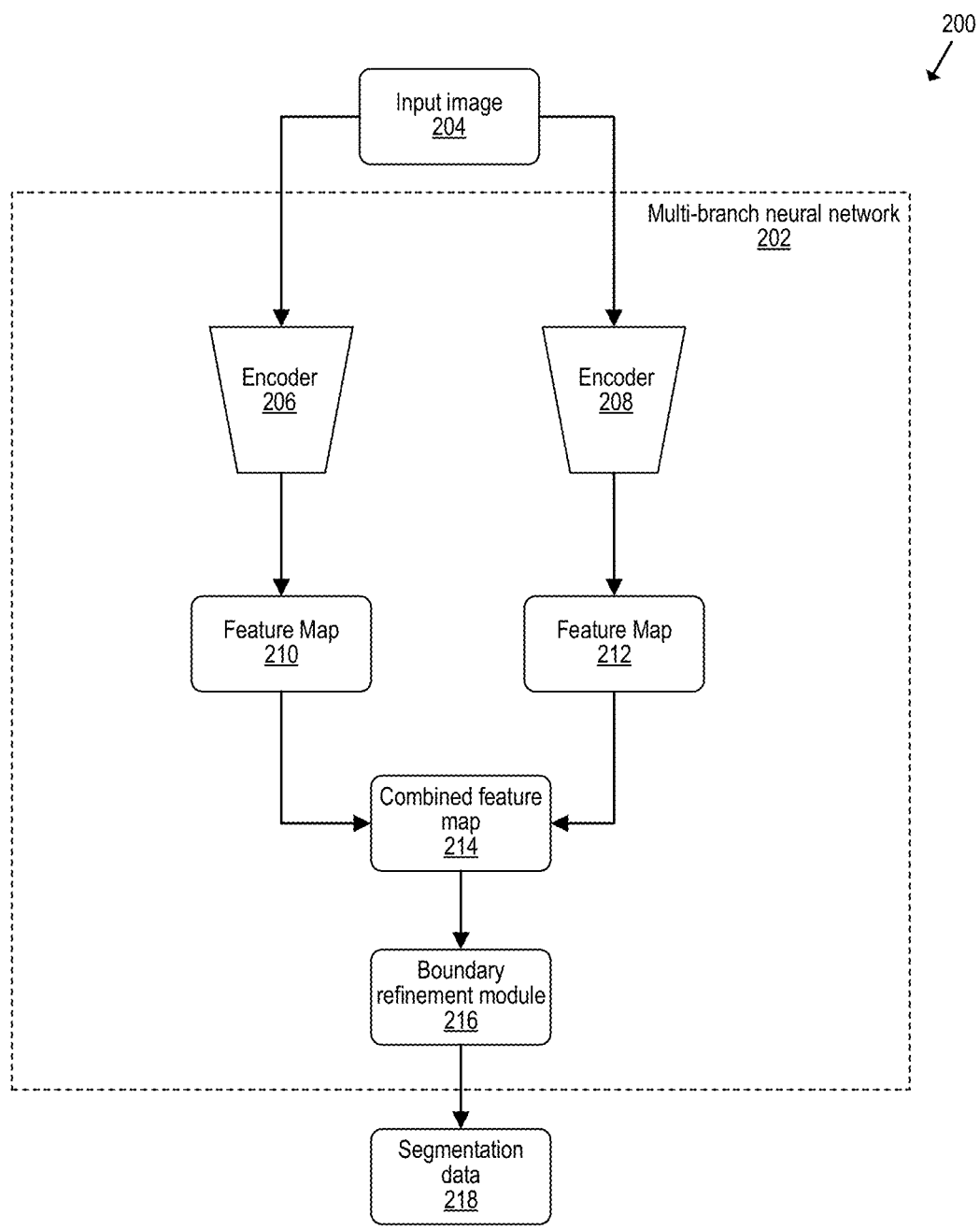
FIG. 2 is a block diagram that illustrates a segmentation process to generate segmentation data based on an image.

The image 14 undergoes a segmentation process to automatically segment the foreground object (e.g., human object) relative to the background to thereby produce a segmented mask for the masked image (step 104). For example, FIG. 2 is a block diagram that illustrates a segmentation process to generate segmentation data from an image. The segmentation process allows for automatic generation of a segmentation mask for a particular foreground object in an input image. The segmentation process obviates the need for user interaction to generate the segmentation mask. In the illustrated example, the segmentation process is composed of a multi-branch convolutional neural network that combines feature maps and refines them to predict an output.

More specifically, the multi-branch neural network 202 receives an input image 204 (e.g., image 14). The multi-branch neural network 202 includes multiple encoders, such as encoder 206 and encoder 208. The encoders 206 and 208 are trained to extract features from an image, and to provide respective feature maps 210 and 212 based on the extracted features. In some cases, the encoders 206 and 208 have a similar structure and training, and provide feature maps 210 and 212 that include similar data describing the extracted features. In some embodiments, the encoder 206 has a structure or training, or both, that are different from the structure and training of encoder 208. For example, the encoder 206 can have a structure that includes multiple neural network layers that are trained to extract high-level features from an input image. The encoder 206 can have a structure that includes few or one neural network layer that are trained to extract low-level features from an image. In some embodiments, additional branches of the multi-branch neural network 202 include additional neural networks, such as additional encoders having training or structure suitable for extracting additional features or types of features.

The encoders 206 and 208 can extract similar features, and the feature maps 210 and 212 can include similar data. In some cases, the encoders 206 and 208 extract different features or different types of features, and each of the feature maps 210 and 212 can include respective data describing the features extracted by the respective encoder. In some cases, additional branches of the multi-branch neural network 202 generate additional feature maps based on the received input image 204.

The multi-branch neural network 202 combines the feature maps generated by the multiple branches. For example, the multi-branch neural network 202 generates a combined feature map 214 based on a combination of the feature maps 210 and 212. Any suitable combination technique may be used, such as concatenation, convolution, a mathematical operation, analysis by an additional neural network, or any other suitable technique. In the multi-branch neural network 202, the combined feature map 214 is provided to a boundary refinement module 216. The boundary refinement module 216 can include one or more neural networks. Based on analysis of the feature data included in the combined feature map 214, the boundary refinement module 216 determines boundaries of one or more regions of the input image 204. For example, the combined feature map 214 includes one or more channels that are associated with one or more pixels of the input image 204. The boundary refinement module 216 can analyze the channels, and determines whether the associated pixel(s) are included in a region of the input image 204, such as a region depicting a human.

The multi-branch neural network 202 can provide segmentation data, such as segmentation data 218. The segmentation data 218 is provided, for example, by the boundary refinement module 216. The segmentation data 218 can be based on analysis of the combined feature map 214. In some cases, the segmentation data 218 includes information describing related areas of the input image 204. For example, the segmentation data 218 can include label data associated with pixels included in the input image 204, e.g., each label indicating whether an associated pixel is part of a region depicting a human figure.

Referring back to FIG. 1, the segmentation data can be provided as the segmentation mask 16 or another digital mask. An embodiment of the segmentation mask 16 is a black-and-white image in which a pixel value indicates a label value (e.g., black corresponds to outside a region and white corresponds to inside the region). The segmentation data can include numerical data associated with the image 14, such as a set of probabilities. Each probability can indicate, for example, a likelihood of whether a given pixel is included in a region depicting a foreground object. The segmented image is input to an encoder 18 that transforms the segmented image into a feature space (step 106). For example, the encoder 18 can have multiple residual blocks (e.g., 3, 4, 5) that convert the image 14 into a feature space (e.g., feature map, feature vector).

Figures 3, 4:
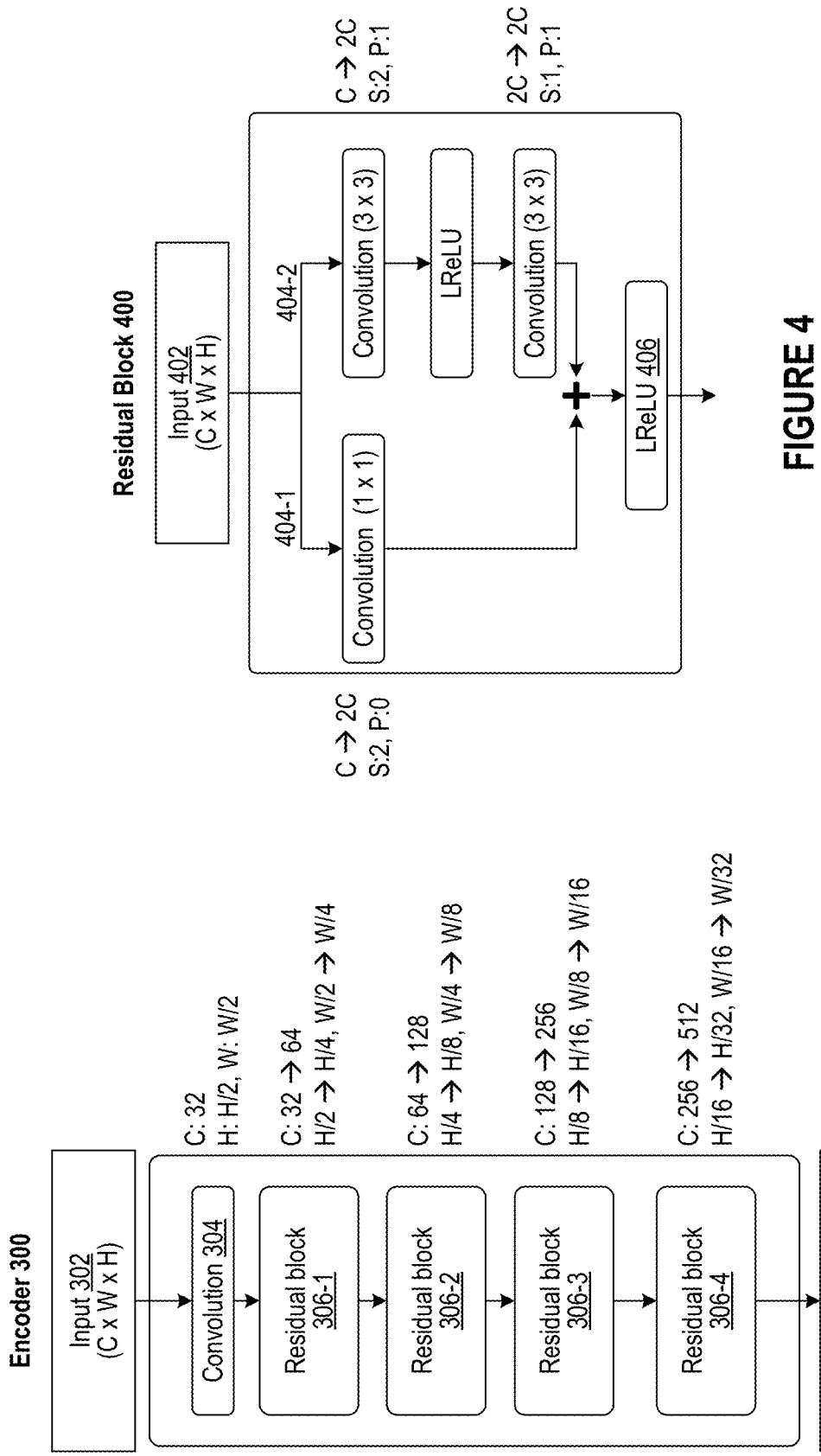
FIG. 3 is a block diagram that illustrates an example of an encoder.
FIG. 4 is a block diagram that illustrates an example of a residual block.

FIG. 3 is a block diagram that illustrates an example of an encoder 300. The encoder 300 receives the input 302 with the foreground object that is going to be relighted in the image. As shown, the encoder 300 performs a convolution 304 followed by a series of residual blocks 306 that sequentially increase by a factor of two for the number of channels, and decrease the dimensions of the input 302 (e.g., width, height) by a factor of two. The output includes a feature map 308 of the input image that will be used in subsequent processes by the framework illustrated in FIG. 1.

FIG. 4 is a block diagram that illustrates an example of a residual block 400. The input 402 can be the segmented image output by the encoder 300. As shown, a residual block can be composed of two convolution branches 404-1 and 404-2 with kernel sizes of one and three, respectively. That is, one convolution branch has a greater kernel size than the other convolution branch. The output of both branches is summed up and forwarded through a non-linear leaky rectified linear unit (LReLU) 406.

The feature space (e.g., feature map 308) output by the encoder 18 is concatenated with the precomputed coefficients 24-1 and 24-2 of a target illumination, and input to the albedo decoder 20 and the light transport decoder 26 to predict an albedo map 22 and a light transport matrix 28, respectively (step 108). The feature space is concatenated with the target illumination to disentangle the decoders 20 and 26 from the target illumination. That is, this process yields ground-truth illumination coefficients to avoid the decoders needing to spend resources learning and, instead, allows them to focus on respective tasks.

FIG. 5 is a block diagram that illustrates processes of an albedo decoder (e.g., the albedo decoder 20) and a light transport decoder (e.g., light transport decoder 26). The albedo and transport decoders include two types of components, the residual and the deconvolutional part. The decoders receive as the output of the encoder concatenated with the illumination coefficients as their input. The residual component includes two residual blocks similar to that shown in FIG. 4. The output of the residual component is input to the convolutional component, which includes several deconvolutional components.

FIG. 6 is a block diagram that illustrates processes of a deconvolution block. As illustrated, a deconvolutional block can have a deconvolution with a kernel of size four, and an LReLU non-linearity. Each input to a deconvolutional block is concatenated with its equivalent output of the residual block in the encoder and by the equivalent output in the light transport decoder. This is done in order to disentangle each branch from solving the task of the other branches. The albedo decoder will output an image with three channels while the light transport decoder will output a tensor with as many channels as illumination coefficients used for the discussed spherical harmonics.

Referring back to FIG. 1, the output of the encoder 18 is also concatenated with the output of a residual part of each decoder 20 and 28 and fed to the light coefficients block 30, which will predict the coefficients for the illumination of the image 14 (step 110). In particular, the illumination coefficients L are obtained by concatenating the output of two residual blocks in the albedo decoder 20 and the light transport decoder 26 with the feature space output by the encoder 18, which is then forwarded to the light coefficients block 30 that outputs a tensor with size 3×Co, where Co is the number of coefficients l used in the spherical harmonics lighting decomposition.

In one example, the albedo decoder 20 and the light transport decoder 26 can each have two residual blocks and then five deconvolutional blocks. The albedo decoder 20 outputs the albedo map 22 ρ with size 3×H×W where H and W is the height and width of the image 14 while the light transport decoder 26 outputs the light transport matrix L with size Co×H×W. All the deconvolutional layers in the decoders 20 and 26 are concatenated with their respective convolutional layer in the encoder. Moreover, the equivalent layers are concatenated between both decoders 20 and 26 to disentangle each decoder 20 and 26. As a result, an albedo map 22 and a light transport matrix 28 are obtained.

Figure 7:
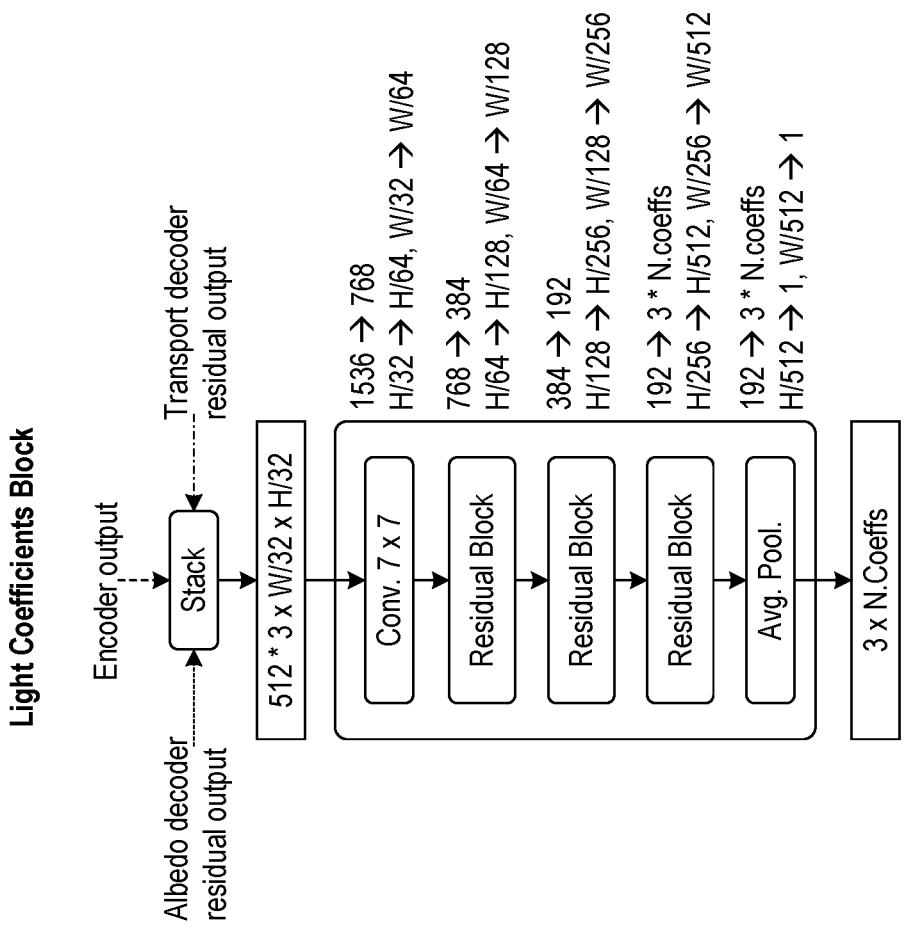
FIG. 7 is a block diagram that illustrates a light coefficients block.

FIG. 7 is a block diagram that illustrates a process of a light coefficients block (e.g., light coefficients block 30). The light coefficients block predicts the illumination coefficients of the input image $L_i$. It has a similar structure to the encoder in FIG. 3. The input of the light coefficients block is the output of the encoder concatenated with the output of the residual part of the albedo and light transport decoders. As shown, the light coefficients block has a convolutional layer with a kernel of size seven and then it is composed of three residual blocks. Additionally, the light coefficients block includes an average pooling after the residual blocks that ensures that the output has a size of 3×Co.

The light transport matrix 28 and the predicted illumination coefficients are multiplied to obtain the shading map 34 of the image 14, which can be forwarded through a refinement block 32-1 that will sharpen the details of the shading (step 112). In particular, a matrix multiplication is performed between the light transport matrix 28 and the predicted illumination coefficients $T_s^T \cdot L$ to obtain the shading map 34. This is a similar calculation as the one performed in spherical harmonics lighting, as described above.

The relight image 36 of the image 14 is then produced based on the albedo map 22 and the shading map 34. In particular, the shading map 34 is scaled by the predicted albedo ρ (e.g., albedo map 22) to produce the relight image ψ'=$(T_s^T \cdot L)$ρ (e.g., relight image 36). The relight image 36 can also be processed through a refinement block $\mathcal{D}$ (e.g., refinement block 32-2) that will denoise the relight image and improve the overall output quality. That is, the shading map 34 can go through a refinement block that generates sharper shadows and reduces the noise.

Figure 8:
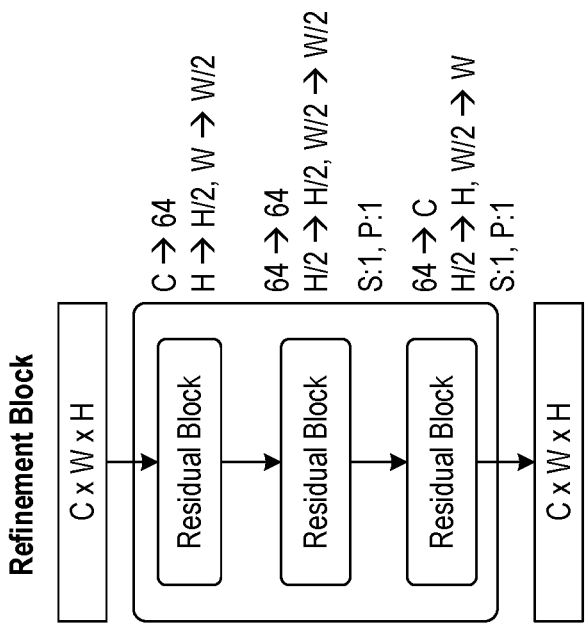
FIG. 8 is a block diagram that illustrates a refinement block.

For example, FIG. 8 is a block diagram that illustrates a process of a refinement block. The refinement block has an architecture that is responsible for denoising pixels of a predicted image. The framework illustrated in FIG. 1 includes two refinement blocks. A first refinement block receives the shading as the input and the second refinement block receives the final relight image as the input. As shown, the refinement block has a simple architecture composed of 3 convolutional components. The output of the refinement component has the same size as the input.

Training

The machine learning models described herein can be trained based on synthetic data, simulated using the algorithms described above. Realistic synthetic data allows for obtaining enough ground-truth samples to train data-driven models such as convolutional neural networks. The synthetic data can include several human figures in different poses under different real-world illuminations. For each foreground object (e.g., human), the framework computes its ground-truth path-traced image, a segmentation mask, albedo map, and light transport coefficients.

In some embodiments, an Adam optimization algorithm can be used for training by adding a term to rectify the variance of the adaptive learning rate. In one instance, the initial learning rate has a value of 0.0002, reduced by a factor of 10 after 15, 25 and 30 epochs. The input image can be normalized to be in the range [−1,+1]. In some embodiments, the framework does not use any normalization layers in the model. In one embodiment, the batch size is one during the training.

Loss Function

To optimize a model, the framework can use a loss function composed of three losses: a total variation loss ($\mathcal{L}_{TV}$) that reduces the noise produced by convolutional neural networks in image prediction, a reconstruction loss ($\mathcal{L}_R$) that calculates a smooth L1 error (that varies between an L1 and L2 loss regarding the magnitude of the error) between the prediction and the ground-truth and allows to predict images similar to the target ones, and a perceptual loss ($\mathcal{L}_{TV}$) that compares the features of the prediction and the ground-truth produced by a convolutional network for classification and detection and improves the quality of predictions with a high-level comparison of the predicted images at the feature level.

The total variation loss is applied on the albedo, $\mathcal{L}_{TV}$ (A), and light transport map, $\mathcal{L}_{TV}$ (T). The reconstruction loss is applied on the albedo, $\mathcal{L}_R$ (A',A), and light transport map, $\mathcal{L}_R$ (T',T), refined shading, $\mathcal{L}_R$ (S',S), illumination coefficients, $\mathcal{L}_R$ (L',L), and on the final relight image, $\mathcal{L}_R$ (I',I). The perceptual loss is applied to the same images as the reconstruction loss: albedo, $\mathcal{L}_{TV}$ (A' A), and light transport map, $\mathcal{L}_{TV}$ (T',T), refined shading, $\mathcal{L}_{TV}$ (S',S), illumination coefficients, $\mathcal{L}_{TV}$ (L',L), and on the final relight image, $\mathcal{L}_{TV}$ (I',I). The final loss is a sum of all the previous terms, equally weighted.

Examples

Figure 9:
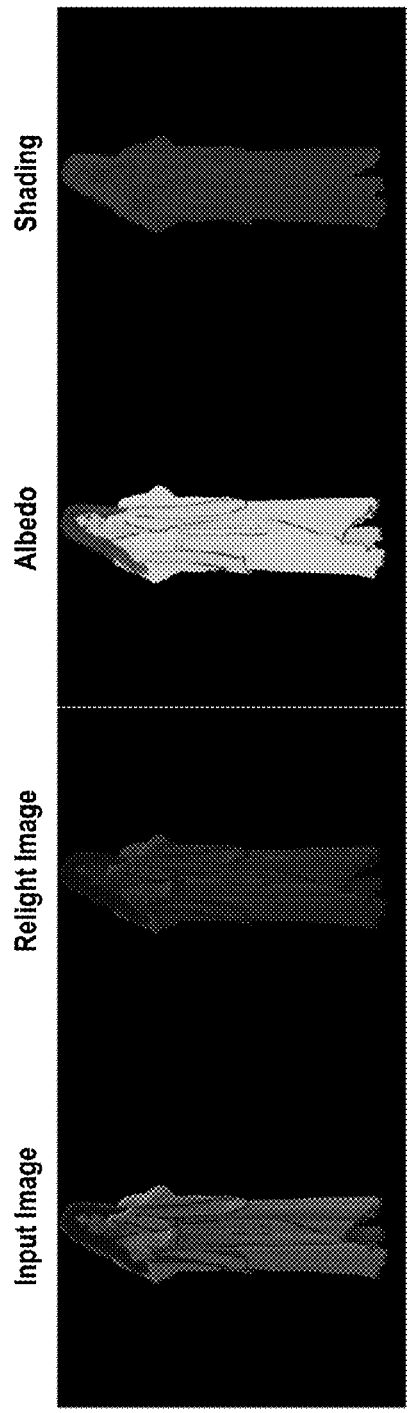
FIG. 9 is an example showing results of synthetic images that have undergone end-to-end relighting.
Figure 10:
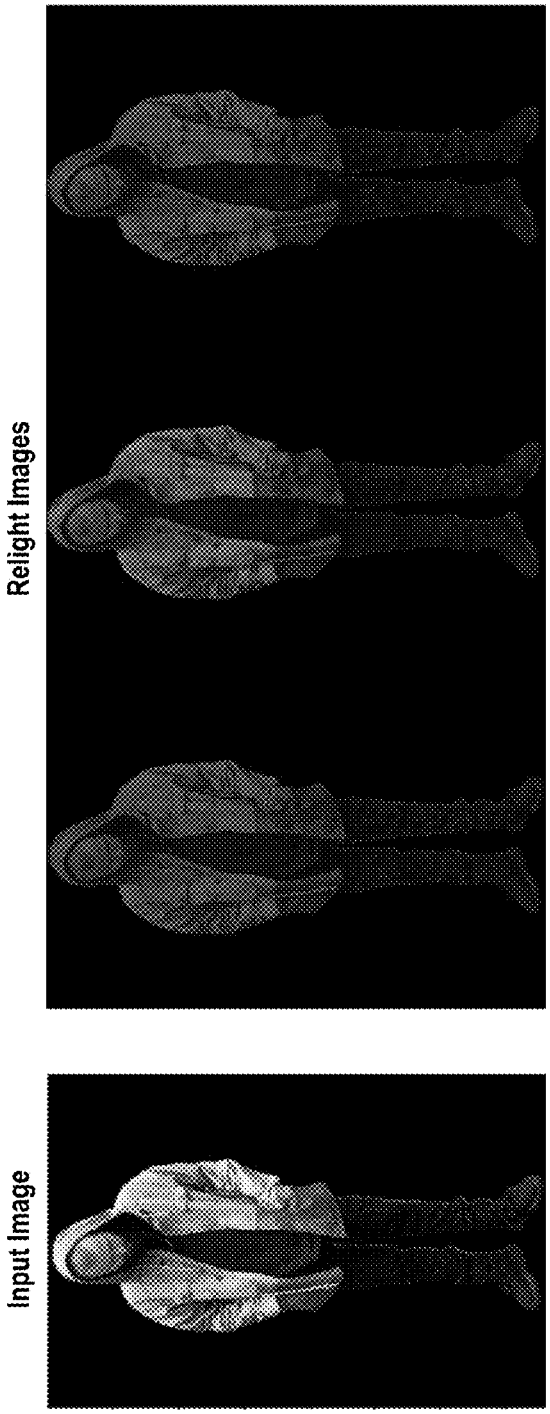
FIG. 10 is an example showing a result of a real photograph of a human that has undergone end-to-end relighting.

An application of the disclosed framework is to automatically relight an image (made, for instance, by a commercial mobile phone) with a target illumination specified by the user. For example, FIG. 9 is an example showing results of synthetic images that are relit from a dataset. FIG. 10 is an example showing a result of relighting of a real photograph of a human. As shown, the human is relight with three different illuminations.

Also, the framework has a light estimation block that is capable of estimating the input illumination $L_i$. This can be leveraged to predict the coefficients L of the input image ψ. This feature could have an impact on immersive media such as virtual reality or augmented reality, where one could obtain the illumination of the scene and automatically relight new objects so that they appear more realistic.

The framework has several differences compared to prior relighting methods. For example, as described earlier, the disclosure technology uses a different deep learning architecture, which is also trained using different loss functions. Further, the framework automatically segments the human figure of an image; thus, user input is not required for segmentation. Moreover, the BRDF is included in the spherical harmonics decomposition, thereby allowing to have a much more realistic representation of materials. In contrast, prior technologies can only model diffuse objects.

The disclosure introduces a wider variety of materials in a training dataset, including glossy and diffuse, metallic materials and translucent materials (skin) with high levels of detail. Further, the disclosure material includes introduce a smooth L1 loss that is more robust during training than the standard L1 loss used in existing systems. The disclosure is operable to disentangle each branch (albedo, transport and albedo) by stacking the illumination coefficients to the input and by concatenating features in the decoders. This allows each branch to focus on a particular task to improve the quality of the results. Further, the disclosed encoders contain residual blocks instead of convolutional blocks which has proven to yield better results since they learn a residual mapping. Another difference is the introduction of a refinement component that significantly improves the quality of the predicted images.

Although the disclosed techniques describe examples in the context of images, the disclosed techniques are similarly applicable to other forms of media. For example, embodiments of the framework can output consistent and accurate video relighting. The illumination coefficients of the target illumination can be automatically predicted with the disclosed model instead of being pre-computed.

Editing System

Figure 11:
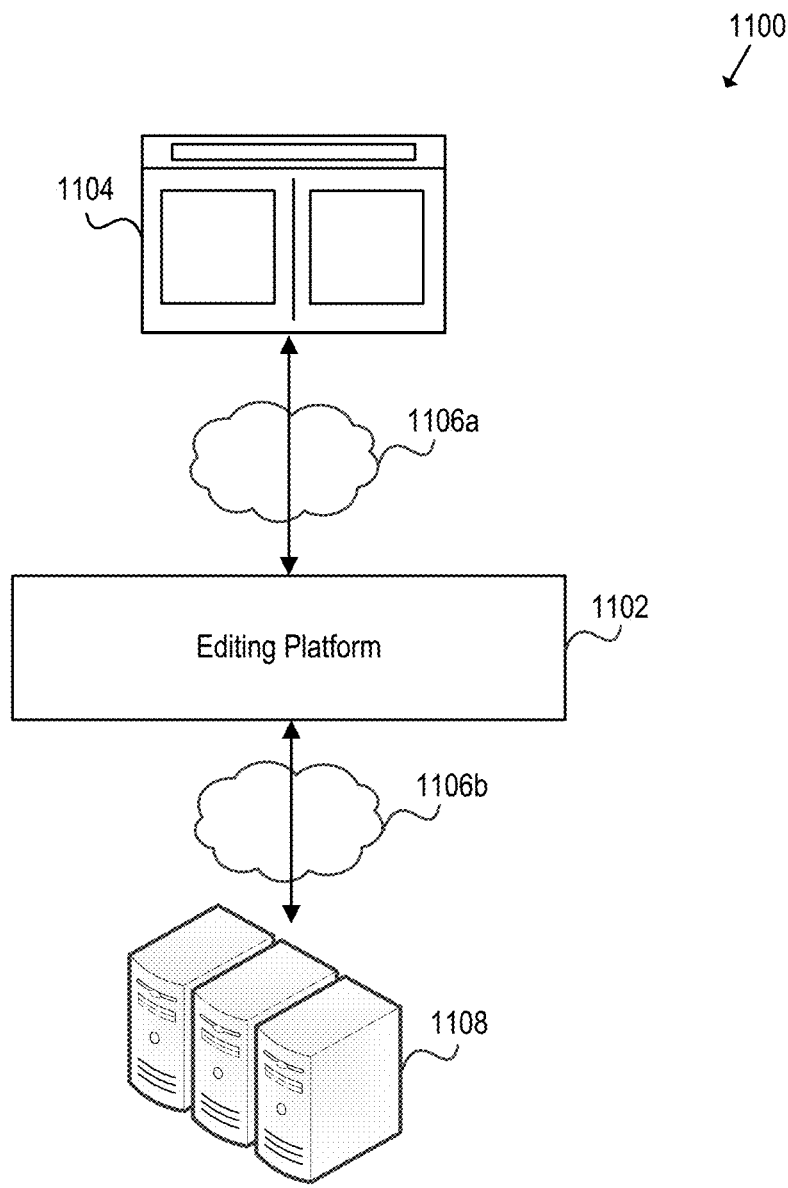
FIG. 11 illustrates a network environment that includes an editing platform that can perform end-to-end relighting in real-time or near real-time.

FIG. 11 illustrates a network environment 1100 that includes an editing platform 1102 to perform relighting of an image. Individuals can interface with the editing platform 1102 via an interface 1104. An example of an editing platform 1102 is any computing device such as a mobile device. The editing platform 1102 may be responsible for performing the end-to-end relighting of an image. For example, an individual may access the editing platform 1102 and then select, via an interface of the editing platform 1102, images from a memory for relighting.

In some embodiments, the editing platform 1102 may reside in a network environment 1100. Thus, the editing platform 1102 may be connected to one or more networks 1106a-b. The network(s) 1106a-b can include personal area networks (PANs), local area networks (LANs), wide area networks (WANs), metropolitan area networks (MANs), cellular networks, the Internet, etc. Additionally or alternatively, the editing platform 1102 can be communicatively coupled to computing device(s) over a short-range communication protocol, such as Bluetooth® or near-field communication (NFC).

The interface 1104 is preferably accessible via a web browser, desktop application, mobile application, and/or over-the-top (OTT) application. Accordingly, the interface 1104 may be viewed on a personal computer, tablet computer, mobile phone, game console, music player, wearable electronic device (e.g., a watch or a fitness accessory), network-connected ("smart") electronic device, (e.g., a television or a home assistant device), virtual/augmented reality system (e.g., a head-mounted display), or some other electronic device.

Some embodiments of the editing platform 1102 are hosted locally. That is, the editing platform 1102 may reside on the computing device used to access the interface 1104. For example, the editing platform 1102 may be embodied as a desktop application executing on a personal computer. Other embodiments of the editing platform 1102 are executed by a cloud computing service operated by Amazon Web Services® (AWS), Google Cloud Platform™, Microsoft Azure®, or a similar technology. In such embodiments, the editing platform 1102 may reside on a host computer server that is communicatively coupled to one or more content computer servers 1108. The content computer server(s) 1108 can include different types of data (e.g., graphics), user information (e.g., profiles and credentials), and other assets. Such information could also be stored on the host computer server.

Certain embodiments are described in the context of network-accessible interfaces. However, those skilled in the art will recognize that the interfaces need not necessarily be accessible via a network. For example, a computing device may be configured to execute a self-contained computer program that does not require network access. Instead, the self-contained computer program may cause necessary assets (e.g., graphics, matching algorithms, and processing operations) to be downloaded at a single point in time or on a periodic basis (e.g., weekly, daily, or hourly).

Computing System

Figure 12:
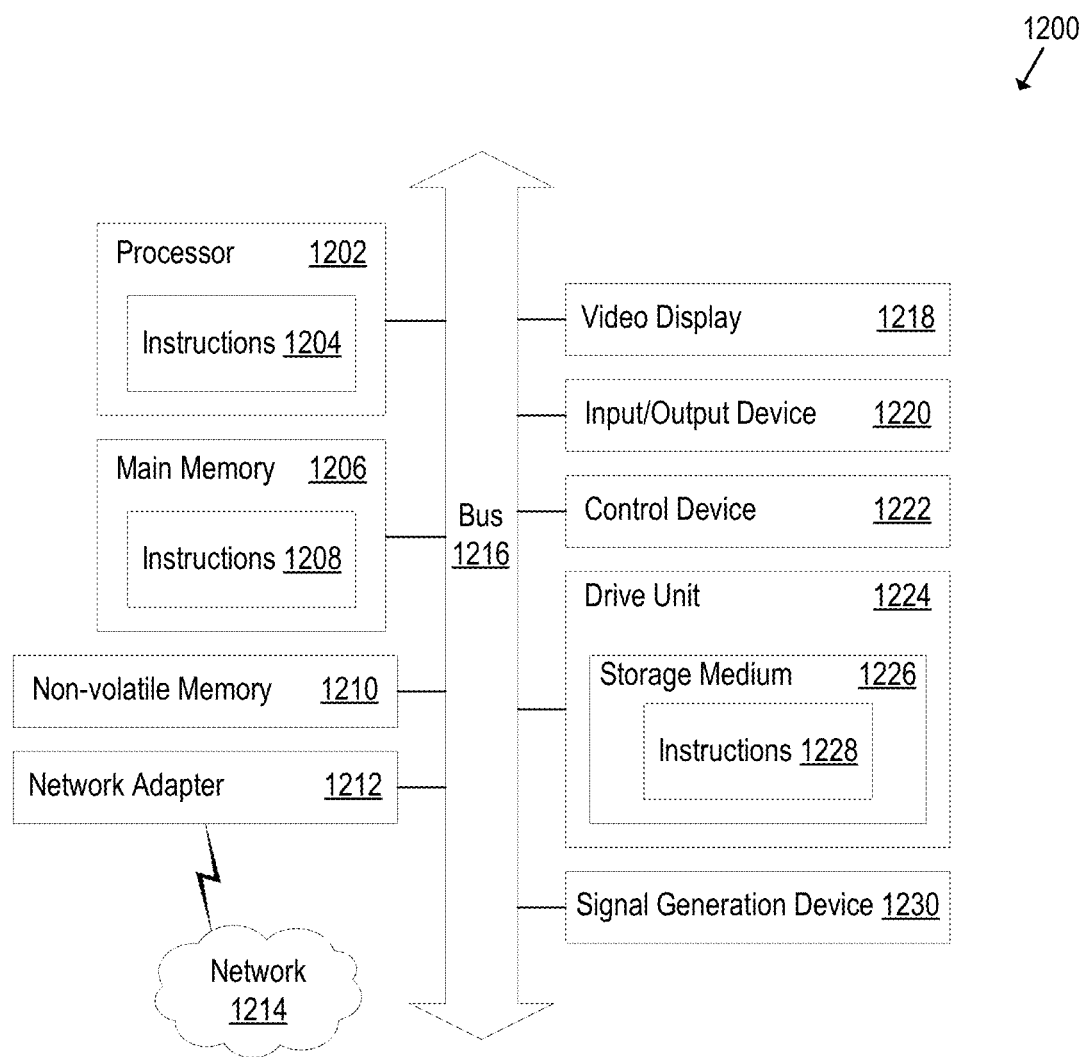
FIG. 12 is a block diagram illustrating an example of a computing system in which at least some operations described herein can be implemented.

FIG. 12 is a block diagram illustrating an example of a computing system 1200 in which at least some operations described herein can be implemented. For example, some components of the computing system 1200 may be hosted on a computing device that includes an editing platform (e.g., the editing platform 1102 of FIG. 11).

The computing system 1200 may include one or more central processing units (also referred to as "processors") 1202, main memory 1206, non-volatile memory 1210, network adapter 1212 (e.g., network interface), video display 1218, input/output devices 1220, control device 1222 (e.g., keyboard and pointing devices), drive unit 1224 including a storage medium 1226, and signal generation device 1230 that are communicatively connected to a bus 1216. The bus 1216 is illustrated as an abstraction that represents one or more physical buses and/or point-to-point connections that are connected by appropriate bridges, adapters, or controllers. The bus 1216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1194 bus (also referred to as "Firewire").

The computing system 1200 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 1200.

While the main memory 1206, non-volatile memory 1210, and storage medium 1226 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1228. The term "machine-readable medium" and "storage medium" shall also be taken to include any medium that is capable of storing, encoding, or carrying a set of instructions for execution by the computing system 1200.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in a computing device. When read and executed by the one or more processors 1202, the instruction(s) cause the computing system 1200 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1210, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1212 enables the computing system 1200 to mediate data in a network 1214 with an entity that is external to the computing system 1200 through any communication protocol supported by the computing system 1200 and the external entity. The network adapter 1212 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1212 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method comprising:
    receiving an image including a foreground object and a background;
    automatically segmenting the foreground object relative to the background to thereby produce a segmented image;
    processing the segmented image with an encoder to convert the segmented image into a feature vector;
    concatenating the feature vector with spherical harmonic coefficients of a target illumination for the image; and
    disentangling an albedo decoder and a light transport decoder separately by:
        generating an albedo map influenced by the target illumination from the feature vector concatenated with the spherical harmonic coefficients of the target illumination utilizing the albedo decoder;
        generating a light transport matrix for the target illumination from the feature vector concatenated with the spherical harmonic coefficients of the target illumination utilizing the light transport decoder;
        predicting illumination coefficients for the image by concatenating a residual output of the albedo decoder and a residual output of the light transport decoder with the feature vector;
        generating a shading map of the image based on the light transport matrix and the illumination coefficients;

producing a relight image of the image based on the albedo map influenced by the target illumination and the shading map.

2. The computer-implemented method of claim 1, wherein the foreground object is a human or an animal.

3. The computer-implemented method of claim 1, wherein automatically segmenting comprises:
receiving the image by a multi-branch neural network;
processing the image with multiple encoders, each of the multiple encoders being trained to extract features from the image, and output respective feature maps based on the extracted features;
combining the feature maps generated by the multiple encoders to thereby produce a combined feature map; and
determining boundaries of the foreground object in the image based on feature data of the combined feature map.

4. The computer-implemented method of claim 3, wherein combining the feature maps comprises:
concatenating the residual output of feature maps generated by the multiple encoders.

5. The computer-implemented method of claim 1, wherein the foreground object is a human, the computer-implemented method further comprising, prior to producing the relight image:
assuming a virtual ground plane where the human in the image is standing, the virtual ground plane being an environmental setting for relighting of the human.

6. The computer-implemented method of claim 1, wherein automatically segmenting the foreground object comprises:
automatically generating a segmentation mask for the foreground object in the image.

7. The computer-implemented method of claim 1, wherein generating the shading map comprises:
performing a matrix multiplication between the light transport matrix and the predicted illumination coefficients.

8. The computer-implemented method of claim 1, wherein automatically segmenting the foreground object comprises:
obtaining the segmented image through a convolution and a series of residual blocks to obtain the feature vector.

9. The computer-implemented method of claim 8, wherein each residual block sequentially increases a channel of the image while decreasing a dimension of the image.

10. The computer-implemented method of claim 8, wherein each residual block has a first convolution branch of a first size and a second convolution branch of a second size greater than the first size.

11. The computer-implemented method of claim 1, wherein the albedo decoder receives as input to a residual block an output of the encoder concatenated with the spherical harmonic coefficients of the target illumination, and an output of the residual block is input to a deconvolutional block that outputs the albedo map influenced by the target illumination and the shading map.

12. The computer-implemented method of claim 1, wherein the light transport decoder receives, as input to a residual block, the output of the encoder concatenated with the spherical harmonic coefficients of the target illumination, and an output of the residual block is input to a deconvolutional block that outputs the light transport matrix.

13. The computer-implemented method of claim 1 further comprising, prior to generating the relight image:
producing a refined image by processing the shading map through a refinement process to generate sharper shadows and reduce noise in the image.

14. The computer-implemented method of claim 13, further comprises:
scaling the refined image by the albedo map influenced by the target illumination and the shading map to obtain the relight image; and
processing the relight image with a refinement block to obtain a refined image.

15. The computer-implemented method of claim 14, wherein the refinement block denoises pixels of the relight image.

16. A non-transitory computer-readable medium with instructions stored thereon that, when executed by a processor, cause the processor to perform operations comprising:
generating a segmentation mask of an image, the segmentation mask defining a boundary of a human object in the image;
transforming a masked image into a feature vector, the masked image including the image and the segmentation mask;
concatenating the feature vector with spherical harmonic coefficients of a target illumination for the image; and
disentangling an albedo decoder and a light transport decoder separately by:
generating an albedo map influenced by the target illumination from the feature vector concatenated with the spherical harmonic coefficients of the target illumination utilizing the albedo decoder;
generating a light transport matrix for the target illumination from the feature vector concatenated with the spherical harmonic coefficients of the target illumination utilizing the light transport decoder;
predicting illumination coefficients of the image by concatenating a residual output of the albedo decoder and a residual output of the light transport decoder with the feature vector;
obtaining a shading map of the image by multiplying the light transport matrix and illumination coefficients;
processing a shaded image with a refinement block to thereby produce a refined image with a sharpened detail, the shaded image including the image and the shading map;
scaling the refined image with the albedo map influenced by the target illumination and the shading map to produce a relight image.

17. The non-transitory computer-readable medium of claim 16, further comprising:
processing the relight image through a refinement block to denoise the relight image.

18. A computing system comprising:
a processor; and
memory containing instructions that, when executed by the processor, cause the computing system to:
automatically detect a boundary of a foreground object in an image;
convert the image with the boundary into a feature vector;
predict an illumination coefficient of the image by concatenating the feature vector with spherical harmonic coefficients of a target illumination; and
disentangle an albedo decoder and a light transport decoder separately by:
generating an albedo map influenced by the target illumination from the feature vector concatenated with the spherical harmonic coefficients of the target illumination utilizing the albedo decoder;

generating a light transport matrix for the target illumination from the feature vector concatenated with the spherical harmonic coefficients of the target illumination utilizing the light transport decoder;

obtain a shading map based on the light transport matrix and the predicted illumination coefficient;

generate a relight image of the image based on the albedo map influenced by the target illumination and the shading map.

19. The computing system of claim 18, wherein the computing system includes a mobile phone.

20. The computing system of claim 18, wherein the computing system includes a server computer and the image is captured by a mobile phone.

* * * * *